United States Patent
Liu et al.

(10) Patent No.: US 8,283,879 B2
(45) Date of Patent: Oct. 9, 2012

(54) BRAKING CONTROLLER OF A THREE-PHASE PERMANENT MAGNETIC BRUSHLESS DC MOTOR FOR DIRECTLY DRIVING A SCREW PUMP

(75) Inventors: Jun Liu, Dongying (CN); Yongjian Tang, Dongying (CN); Hengli Cong, Dongying (CN)

(73) Assignee: Millennium Oilflow systems & Technology Inc., Edmonton, Alberta (CA)

( * ) Notice: Subject to any disclaimer, the term of this patent is extended or adjusted under 35 U.S.C. 154(b) by 509 days.

(21) Appl. No.: 12/375,957

(22) PCT Filed: Aug. 4, 2006

(86) PCT No.: PCT/CN2006/001968
§ 371 (c)(1),
(2), (4) Date: Mar. 17, 2010

(87) PCT Pub. No.: WO2008/017212
PCT Pub. Date: Feb. 14, 2008

(65) Prior Publication Data
US 2010/0166572 A1    Jul. 1, 2010

(51) Int. Cl.
*H02P 3/10*  (2006.01)
*F04C 18/08*  (2006.01)
(52) U.S. Cl. ............. 318/374; 318/370; 417/44.11; 418/9; 418/201.1
(58) Field of Classification Search .......... 318/370, 318/374, 437, 732, 400.1, 400.2, 400.32; 417/44.11; 418/9, 201.1
See application file for complete search history.

(56) References Cited

U.S. PATENT DOCUMENTS

| | | | | |
|---|---|---|---|---|
| 4,385,267 A | * | 5/1983 | Herbert et al. | 318/732 |
| 4,385,268 A | * | 5/1983 | Herbert et al. | 318/732 |
| 4,576,265 A | * | 3/1986 | Kumura et al. | 477/95 |
| 6,727,667 B2 | * | 4/2004 | Cheng et al. | 318/135 |
| 7,652,441 B2 | * | 1/2010 | Ying Yin Ho | 318/400.32 |
| 7,847,498 B2 | * | 12/2010 | Shibuya | 318/400.01 |
| 7,969,109 B2 | * | 6/2011 | Masuo et al. | 318/437 |
| 2007/0001635 A1 | * | 1/2007 | Ho | 318/254 |
| 2007/0075671 A1 | * | 4/2007 | Ahn et al. | 318/701 |
| 2008/0048598 A1 | * | 2/2008 | Shibuya | 318/400.1 |
| 2009/0167214 A1 | * | 7/2009 | Masuo et al. | 318/14 |
| 2009/0315492 A1 | * | 12/2009 | Oomura | 318/400.02 |
| 2010/0141191 A1 | * | 6/2010 | Chen et al. | 318/400.33 |
| 2010/0222970 A1 | * | 9/2010 | Shono et al. | 701/50 |
| 2011/0017165 A1 | * | 1/2011 | Osawa et al. | 123/179.4 |
| 2011/0262112 A1 | * | 10/2011 | Tanaka et al. | 388/811 |

FOREIGN PATENT DOCUMENTS

| | | |
|---|---|---|
| CN | 1683791(A) | 10/2005 |
| CN | 2769553(Y) | 4/2006 |
| JP | 2000064966(A) | 3/2000 |

* cited by examiner

*Primary Examiner* — Paul Ip

(57) ABSTRACT

A braking controller of a three-phase permanent magnetic brushless DC motor for directly driving a screw pump includes a detection circuit for detecting power supply states of the three-phase permanent magnetic brushless DC motor and a braking circuit for controlling the braking startup according to the power supply states of the three-phase permanent magnetic brushless DC motor. When the motor is supplied with power, the braking circuit is cut off. When the motor is not supplied with power and the screw pump drives the motor to reverse, the braking circuit starts up.

3 Claims, 3 Drawing Sheets

BRAKING CONTROLLER OF A THREE-PHASE PERMANENT MAGNETIC BRUSHLESS DC MOTOR FOR DIRECTLY DRIVING A SCREW PUMP

TECHNICAL FIELD

The present invention pertains to a braking controller of motor direct drive oil-extracting screw pump; in particular, to a braking controller of the reversal speed inhibition of three phase permanent magnet brushless direct current motor for direct drive screw pump.

BACKGROUND OF THE INVENTION

Screw pump belongs to high efficiency oil-extracting apparatus, there are two main reasons for the shutdown and reversal of motor of the screw pump:

1. When the rotator is made to rotate by the drive device of rod pump, elastic deformation will be produced in the long polished rod. The downhole rotator starts rotate after the most apex of polished rod rotates for tens of cycles, the elastic energy of these tens of cycles will be released when shutdowns, thus the parts of the polished rod close to ground will reversely rotate back with high speed if no inhibition is applied, the high speed reverse rotation will lead to reversal tripping accident of polished rod because the polished rod is formed by many nodes connected to each other (except continuous rod). To ensure the safety of polished rod, braking means must be employed.

2. When shut downs, the reflux of liquid will be produced by the action of liquid pressure and pipeline pressure in the tubing and will drive the rotator of screw pump to rotate reversely with high speed like a hydro-generator, such phenomena will happen in both ground drive rod pump and rodless pump submerged in the oil downhole. When liquid flows reversely, the part of the transmission shaft connected to the rotator will always be broken by the drastic liquid reflux (especially for submerged rodless pump).

At present, there are two main braking means are employed by screw pump: the first one is stop reversal by ratcheting, this means is a type of mechanical absolute reversal stop and does not allow the polished rod rotate reversely, this means has a simple structure while the reliability is poor, at the same time, it also has the problems such as: the initial torque is too great and will cause a starting impact when restarts, and the elastic transformation must be released in workover operation, mechanical damage or human injury accidents will be caused when operation is not suitable. The second is stop reversal by hydraulic pressure, which has a high reliability, however, the cost is high and the structure is complex, thus the investment on apparatus is increased.

SUMMARY OF THE INVENTION

The purpose of the invention is to provide a braking controller of the reversal speed inhibition of motor for direct drive screw pump, to overcome the disadvantages of mechanical braking of screw pump.

The present invention relates to a braking controller of the three phase permanent magnet brushless direct current motor for direct drive screw pump, which comprises: detecting circuit for detecting the state of power supply of the three phase permanent magnet brushless direct current motor; braking circuit for controlling the starting of brake according to the state of power supply of the permanent magnet synchronous motor, which is disconnected when power is supplied for the motor to work and can be started when no power is supplied to the motor and the motor rotates reversely driven by the screw pump.

The present invention installs a braking circuit on the three phase permanent magnet brushless direct current motor for the direct drive screw pump, through which successfully realizes the soft braking of the three phase permanent magnet brushless direct current motor for the direct drive screw pump, and the elastic force of the polished rod of the screw pump can be sufficiently slow be released, thus overcome the disadvantage of mechanical braking.

The braking controller of the three phase permanent magnet brushless direct current motor for direct drive screw pump of the present invention, in which the detecting circuit comprises: a motor controller, current transformer L, normal-closed relay MJ, in which the detecting circuit connects between the any two phases of the three phase current input terminal of motor controller, current transformer closes to the three phase current output terminal of the motor controller, the current transformer connects to normal-closed relay in series, the braking circuit comprises: three large power energy consumption resistances RA, RB and RC connected in series on the three phase current output circuit of the motor controller, in which each energy consumption resistances connects to the contacts MJ-A, MJ-B or MJ-C of normal-closed relay in series.

The braking controller of the three phase permanent magnet brushless direct current motor for direct drive screw pump of the present invention, in which the detecting circuit comprises: a motor controller, current transformer L, normal-closed relay MJ, rectifier diodes Q1 and Q2, rectifier triodes V and current limiting impedance element Z1, in which the detecting circuit connects between the any two phases of the three phase current input terminal of motor controller, current transformer L closes to the three phase current output terminal of the motor controller, the current transformer L and normal-closed relay, rectifier diodes Q1 and Q2, rectifier triodes V and current limiting impedance element Z1 connect in series, the braking circuit comprises: three large power energy consumption resistances connected in series on the three phase current output circuit of the motor controller, in which each energy consumption resistance RA, RB and RC connect to one of the large power bidirectional triode thyristor MC-A, MC-B or MC-A in series, the state of turn-on of the large power bidirectional triode thyristor is controlled by the normal-closed relay.

When power is supplied for the motor to work, the screw pump is driven to forward rotate and induction current is generated by current transformer, two terminals of normal-closed relay are charged, the contact of the normal-closed relay disconnects, that is the braking circuit does not start and the energy consumption resistance is not connected. When the power supplied for the motor is stopped, no induction current exists in the current transformer, two terminals of normal-closed relay are not charged, the contact of the normal-closed relay MC-A, MC-B and MC-C connects, the braking circuit starts and the energy consumption resistance RA, RB and RC connects; at this time, the rotator of screw pump rotates reversely and drives the motor rotate reversely, the state of permanent magnet motor changes to the working state of generator, since the he energy consumption resistance has a fixed resistance, the braking torque of the generator is higher when the speed of reverse rotation is higher, thus inhibits the speed of reverse rotation and realizes the soft braking of the motor.

Advantageous Effect:

The braking controller of the present invention has a simple structure, convenient operation and good braking property. The mechanical braking apparatus of screw pump is omitted and the disadvantage of mechanical braking is overcome. When used on rod direct drive screw pump, said braking controller can release the elastic force of the polished rod sufficiently slow; when used on submerged rodless pump, said braking controller can prevent the break of transmission shaft due to the reflux of liquid. After shutdown is stabilized, the initial torque of next starting is very small and easy to be started, reverse rotation will also not happen in workover operation and accidents can be prevented.

The braking controller of the present invention can save energy consumption. Since said braking is achieved by the electric braking of the power generated by the reverse rotation of generator, a higher acceleration of reverse rotation will lead to a higher electric braking, finally the elastic energy of polished rod and reflux energy of liquid is slowly released completely and back to the initial state, thus realizes the soft braking. Therefore, no external energy is required for braking.

DESCRIPTION OF THE PREFERRED EMBODIMENTS

Figure 1:
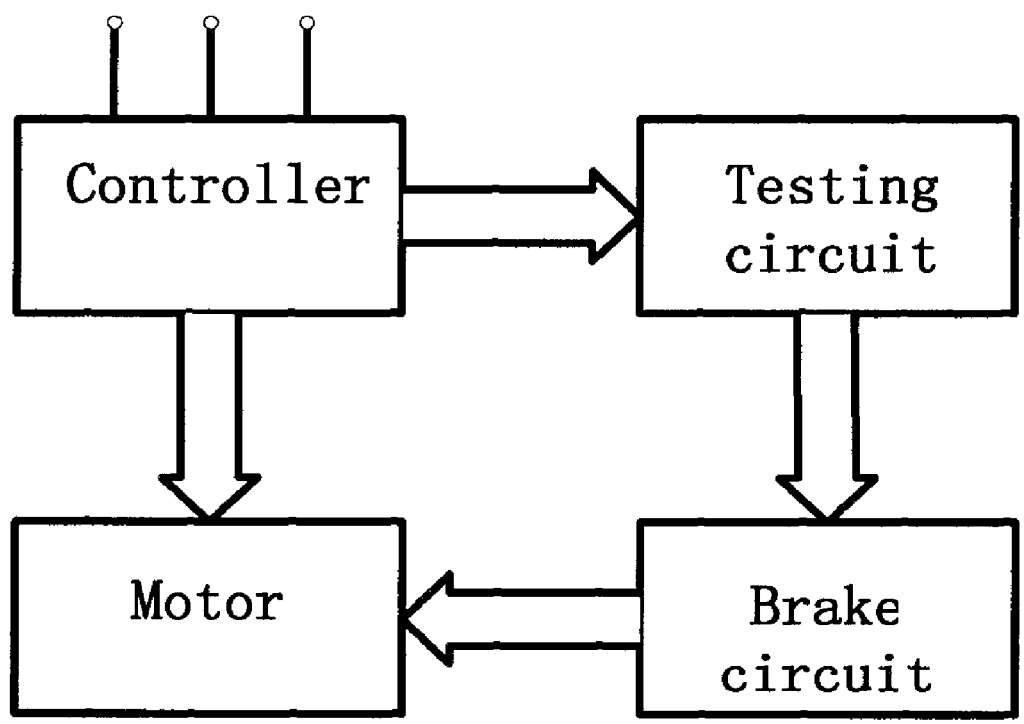
FIG. 1 is the circuit block diagram of the braking controller of motor direct drive oil-extracting screw pump according to the present invention.
Figure 2:
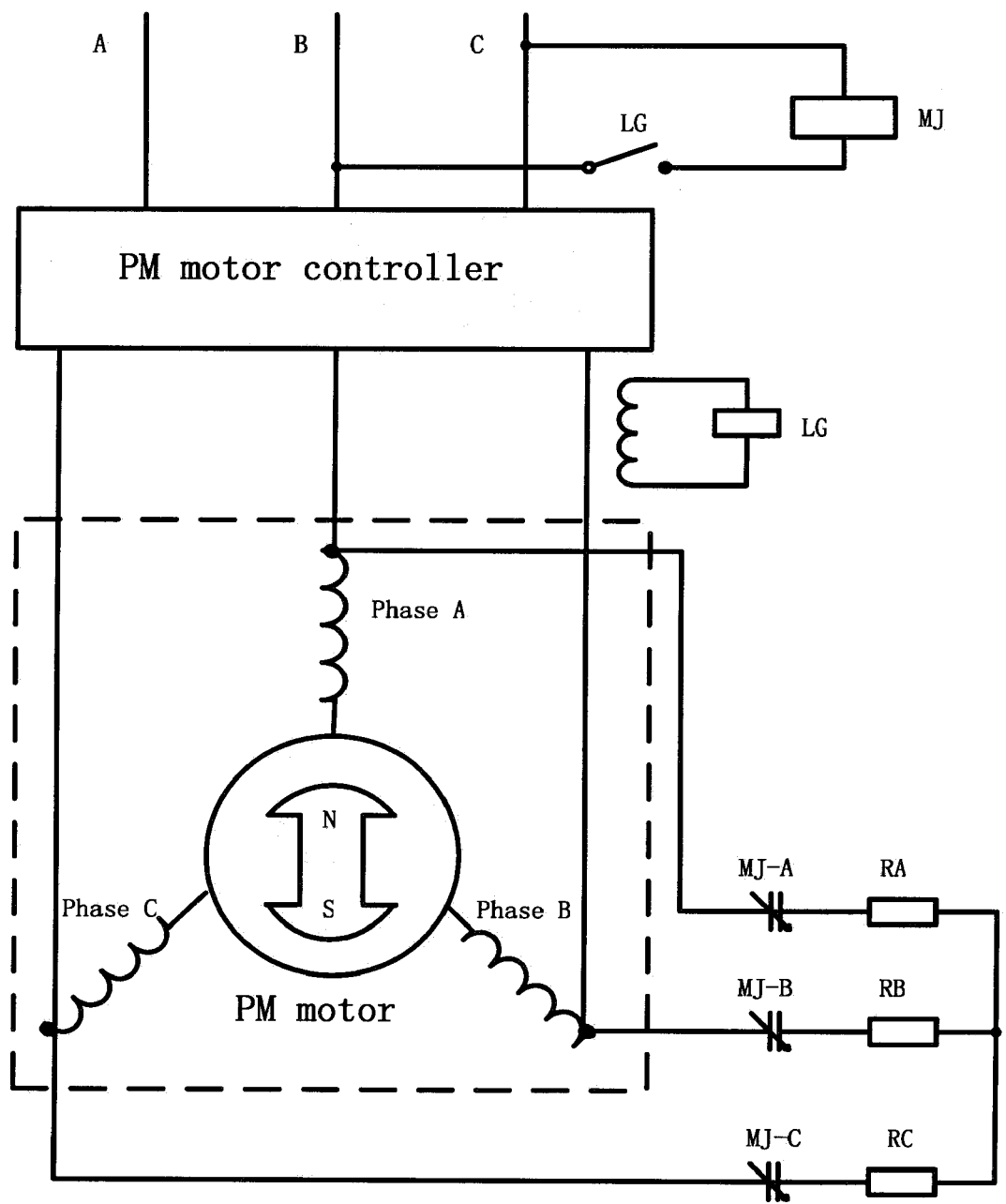
FIG. 2 is the circuit principle diagram of the braking controller of motor direct drive oil-extracting screw pump according to the present invention.

Embodiment 1 (see FIG. 2)

The braking controller of the three phase permanent magnet brushless direct current motor for direct drive screw pump of the present invention, in which the detecting circuit comprises: a motor controller 1, current transformer 2, normal-closed relay 3, in which the detecting circuit connects between the any two phases of the three phase current input terminal of motor controller, current transformer closes to the three phase current output terminal of the motor controller, the current transformer connects to normal-closed relay in series, the braking circuit comprises: three large power energy consumption resistances 4 connected in series on the three phase current output circuit of the motor controller, in which each energy consumption resistances connects to the contacts 5, 6 or 7 of normal-closed relay in series.

When power is supplied for the motor to work, the screw pump is driven to forward rotate and induction current is generated by current transformer, two terminals of normal-closed relay are charged, the contact of the normal-closed relay MC-A, MC-B and MC-C disconnects. When the power supplied for the motor is stopped, no induction current exists in the current transformer, two terminals of normal-closed relay are not charged, the contact of the normal-closed relay MC-A, MC-B and MC-C connects, the energy consumption resistance RA, RB and RC connects, the braking circuit starts at this time. Since the permanent magnet motor stop working, the rotator of screw pump rotates reversely and drives the motor rotate reversely. The state of permanent magnet motor changes to the working state of generator at this time, since the he energy consumption resistance has a fixed resistance, the dynamic torque of the generator is higher when the speed of reverse rotation is higher, thus inhibits the speed of reverse rotation of the motor.

Figure 3:
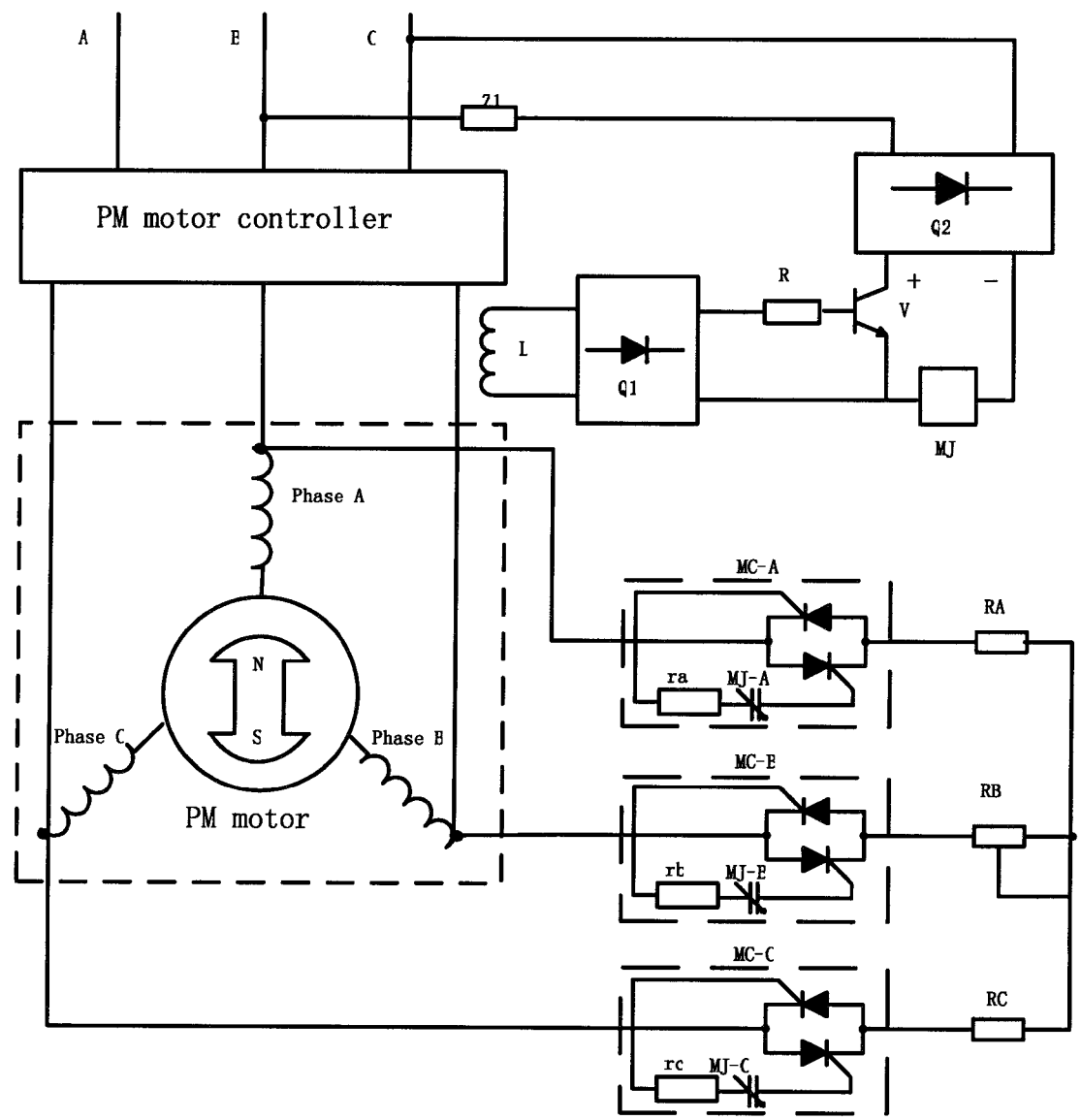
FIG. 3 is the circuit principle diagram of the braking controller of the motor direct drive oil-extracting screw pump according to the preferred embodiment of the present invention.

Embodiment 2 (see FIG. 3)

The braking controller of the three phase permanent magnet brushless direct current motor for direct drive screw pump of the present invention, in which the detecting circuit further comprises: a motor controller 1, current transformer 2, normal-closed relay 3, rectifier diodes 8, rectifier triodes 9 and current limiting impedance element 10, in which the detecting circuit connects between the any two phases of the three phase current input terminal of motor controller 1, current transformer 2 closes to the three phase current output terminal of the motor controller, the current transformer 2 and normal-closed relay 3, rectifier diodes 8, rectifier triodes 9 and current limiting impedance element 10 connect in series, the braking circuit comprises: three large power energy consumption resistances are connected in series on the three phase current output circuit of the motor controller, in which each energy consumption resistance 4 connects to one of the large power bidirectional triode thyristor 11, 12 or 13 in series, in which the state of the large power bidirectional triode thyristor 11, 12 or 13 is controlled by the normal-closed relay to be turn-on.

When power is supplied for the motor to work, the screw pump is driven to forward rotate and induction current is generated by current transformer, two terminals of normal-closed relay are charged, the contact of the normal-closed relay MC-A, MC-B and MC-C disconnects, the large power bidirectional triode thyristor MC-A, MC-B and MC-C disconnects; when the power supplied for the motor is stopped, no induction current exists in the current transformer, two terminals of normal-closed relay are not charged, the contact of the normal-closed relay MC-A, MC-B and MC-C connects, the large power bidirectional triode thyristor MC-A, MC-B and MC-C connect, the energy consumption resistance RA, RB and RC connects, the braking circuit starts at this time. Since the permanent magnet motor stop working, the rotator of screw pump rotates reversely and drives the motor rotate reversely. The state of permanent magnet motor changes to the working state of generator at this time. Since the he energy consumption resistance has a fixed resistance, the dynamic torque of the generator is higher when the speed of reverse rotation is higher, thus inhibits the speed of reverse rotation of the motor.

The invention claimed is:

1. A braking controller of a three phase permanent magnet brushless direct current motor for direct drive screw pump comprises: detecting circuit for detecting the state of power supply of the three phase permanent magnet brushless direct current motor; braking circuit for controlling the starting of brake according to the state of power supply of the permanent magnet synchronous motor, characterized in that the braking circuit starts when no power is supplied to the motor and the motor rotates reversely driven by the screw pump.

2. The braking controller of the three phase permanent magnet brushless direct current motor for direct drive screw pump according to claim 1, characterized in that the detecting circuit comprises: motor controller, current transformer (L), normal-closed relay (MJ), in which the detecting circuit connects between the any two phases of the three phase current input terminal of motor controller, current transformer closes to the three phase current output terminal of the motor controller, the current transformer and normal-closed relay connect in series; the braking circuit comprises: three large power energy consumption resistances (RA, RB and RC) connected in parallel on the three phase current output circuit of the motor controller, in which each energy consumption resistance connects with the contacts MJ-A, MJ-B or MJ-C of normal-closed relay in series.

3. The braking controller of the three phase permanent magnet brushless direct current motor for direct drive screw pump according to claim 1, characterized in that the detecting circuit comprises: motor controller, current transformer (L), normal-closed relay (MJ), rectifier diodes (Q1 and Q2), rectifier triodes (V) and current limiting impedance element (Z1), in which the detecting circuit connects between the any two phases of the three phase current input terminal of the motor controller, current transformer (L) closes to the three phase current output terminal of the motor controller, the current transformer (L) and normal-closed relay (MJ), rectifier diodes (Q1 and Q2), rectifier triodes (V) and current limiting impedance element (Z1) connect in series; the braking circuit comprises: three large power energy consumption resistances connected in parallel on the three phase current output circuit of the motor controller, in which each energy consumption resistance (RA, RB or RC) connect to one of the large power bidirectional triode thyristor (MC-A, MC-B or MC-A) in series, the state of turn-on of the large power bidirectional triode thyristor is controlled by the normal-closed relay.

\* \* \* \* \*